Figure 1:
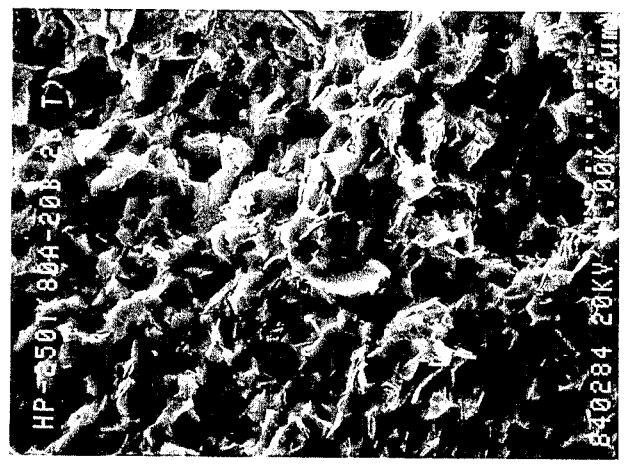

United States Patent [19]

Kuramoto et al.

[11] Patent Number: 4,642,298
[45] Date of Patent: Feb. 10, 1987

[54] COMPOSITE NITRIDE SINTERED BODY

[75] Inventors: Nobuyuki Kuramoto, Sagamihara; Kazuya Takada, Tokyo; Yoshihiko Numata, Fujisawa, all of Japan

[73] Assignee: Tokuyama Soda Kabushiki Kaisha, Yamaguchi, Japan

[21] Appl. No.: 711,215

[22] Filed: Mar. 13, 1985

[30] Foreign Application Priority Data

Mar. 15, 1984 [JP] Japan .................. 59-48092

[51] Int. Cl.$^4$ .............................................. C04B 35/58
[52] U.S. Cl. ........................................ 501/96; 264/60; 264/66; 501/98
[58] Field of Search ............ 501/96, 98, 124; 423/412; 264/65, 66, 60

[56] References Cited

U.S. PATENT DOCUMENTS

| 3,108,887 | 10/1963 | Lenie et al. | 501/98 |
| 3,813,252 | 5/1974 | Lipp | 501/98 |
| 3,854,967 | 12/1974 | Reinmuth | 501/98 |
| 4,435,513 | 3/1984 | Komeya et al. | 501/96 |
| 4,519,966 | 5/1985 | Aldinger et al. | 264/66 |
| 4,540,673 | 9/1985 | Takeda et al. | 501/96 |

FOREIGN PATENT DOCUMENTS

| 57-191276 | 11/1982 | Japan | 501/96 |
| 58-032073 | 2/1983 | Japan | 501/96 |
| 640896 | 1/1979 | U.S.S.R. | 501/96 |

OTHER PUBLICATIONS

GEM-680 Aluminum Nitride-Circular of Engineered Materials of Hi-Purity Materials, Inc., NY, NY (1981).

Primary Examiner—Helen M. McCarthy
Attorney, Agent, or Firm—Wenderoth, Lind & Ponack

[57] ABSTRACT

A composite nitride sintered body consisting essentially of aluminum nitride, boron nitride and at least one metal compound selected from the group consisting of compounds of metals of Groups IIa and IIIa of the periodic table.

The composite nitride sintered body is produced by intimately mixing a powder of aluminum nitride, a powder of boron nitride and at least one metal compound selected from the group consisting of metal compounds of metals of Groups IIa and IIIa of the periodic table, and sintering the mixture under atmospheric or elevated pressures at a temperature in the range of 1600° to 2400° C.

The sintered body has a good machinability.

11 Claims, 2 Drawing Figures

COMPOSITE NITRIDE SINTERED BODY

This invention relates to a composite nitride sintered body composed of aluminum nitride and boron nitride.

Various ceramics or ceramic composites have heretofore been used as materials for various industrial and household machines and appliances or electronic machines and appliances.

Japanese Patent Publication No. 25359/1968 discloses a method for producing a strongly anticorrosive nonmetallic product by compressing aluminum nitride particles under a pressure of at least 1000 pounds/inch$^2$ at a temperature in the range of 1600° to 2200 ° C. This patent document describes that a high-density compact article can also be produced from a mixture of aluminum nitride powder and a powder of an inorganic ceramic material such as boron nitride and silicon carbide by the same method. It, however, does not at all disclose any specific method of producing a composite nitride sintered body from a mixture of aluminum nitride powder and boron nitride powder, and therefore gives no disclosure about sintering aids for such a composite nitride sintered body.

Japanese Patent Publication No. 30163/1977(U.S. Pat. No. 3,854,967) describes a method for producing a high temperaturestable, anticorrosive material which comprises treating a mixture of 10 to 60% by weight of aluminum nitride and 90 to 40% by weight of boron nitride in the presence of boron oxide at a temperature of 1500° to 2200 ° C. under a pressure of 30 to 200 kg/cm$^2$. This patent document states that a material produced by this method from a mixture of 50% of AlN, and 50% of BN containing 15% of $B_2O_3$ can be ground by a rotating grinding wheel, and that if the content of aluminum nitride is extremely high, the resulting material can no longer be machined. It also emphasizes a special role which the boron oxide plays, namely the fact that boron oxide reacts with aluminum nitride and the resulting product binds aluminum nitride and boron nitride to each other. This patent document does not disclose a composite nitride material which can be machined even when its boron nitride content is low.

Japanese Laid-Open Patent Publication No. 32073/1983 describes a sintered material composed of aluminum nitride and 0.1 to 30% by weight of boron nitride. It fails to disclose any sintering aid for the production of this composite nitride sintered material and says nothing about the machinability of the sintered material.

It is an object of this invention to produce a novel composite nitride sintered body.

Another object of this invention is to provide a composite nitride sintered body which is classed as so-called machinable ceramics and can be machined in a usual manner on lathes, drilling machines, milling machines, etc. using tools made of superhard materials such as tungsten carbide and titanium nitride, sintered diamond, etc.

Still another object of this invention is to provide a composite nitride sintered body having high hardness, high strength, excellent heat resistance, a high thermal conductivity, a low coefficient of thermal expansion, a low dielectric constant, a low dielectric loss, high insulation, excellent corrosion resistance and excellent lubricity.

A further object of this invention is to provide a method for producing the aforesaid composite nitride sintered body of the invention.

Other objects and advantages of this invention will become apparent from the following description.

These objects and advantages are achieved in accordance with this invention by a composite nitride sintered body consisting essentially of aluminum, nitride, boron nitride, and at least one metal compound selected from the group consisting of compounds of metals of Groups IIa and IIIa of the periodic table.

According to this invention, the composite nitride sintered body of this invention can be produced in accordance with this invention by a method which comprises intimately mixing aluminum nitride powder, boron nitride powder and a powder of at least one metal compound selected from the group consisting of compounds of metals of Groups IIa and IIIa of the periodic table, and sintering the mixture at a temperature of 1600° to 2400° C. under atmospheric or elevated pressures.

Figure 2:
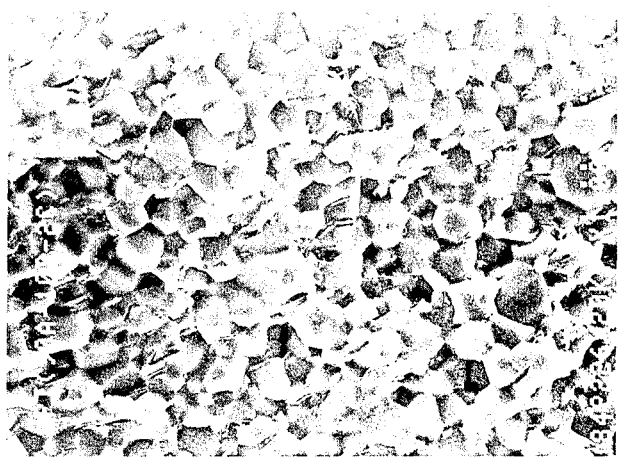

The accompanying drawings, FIGS. 1 and 2, show microphotographs of mechanically fractured sectional surfaces of composite nitride sintered bodies of this invention taken through a scanning electron microscope.

The aluminum nitride powder used in this invention is not particularly restricted, and aluminum nitride powders of any properties can be used. Preferably, the aluminum nitride powder has an average particle diameter of not more than 2 micrometers, an oxygen content of not more than 3.0% by weight, preferably not more than 1.5% by weight, and a purity of at least 95%. Especially preferably, the aluminum nitride powder consists of particles of uniform small sizes. Generally, an aluminum nitride powder containing at least 70% by volume of particles having a size of not more than 3 micrometers in addition to having the aforesaid properties is most preferred. No commercial aluminum nitride powders heretofore put on the market have an average particle diameter of not more than 2 micrometers and an oxygen content of not more than 3.0% by weight and contain at least 70% by volume of particles with a particle diameter of not more than 3 micrometers. In a laboratory, aluminum nitride having an average particle diameter of not more than 2 microns can be obtained by pulverization and classification. Since, however, the surface of aluminum nitride is oxidized during the pulverizing step, it is substantially impossible by a conventional method to obtain an aluminum nitride powder having an oxygen content of not more than 3.0% by weight, particularly not more than 1.5% by weight.

The average particle diameters or particle size distributions as referred to in the present invention are those measured by using a light transmission-type particle size distribution analyser (for example, CAPA-500 made by Horiba Seisakusho, Co., Ltd.). It has previously been thought that the sinterability of the aluminum nitride powder increases with increasing oxygen content. It has been found however that in the aluminum nitride powder used in the invention having a small average particle diameter and preferably a uniform particle size distribution, the low oxygen content at least does not adversely affect its sinterability, and lower oxygen contents give better thermal conductivity to the resulting sintered bodies. Hence, the average particle diameter and oxygen content of the aluminum nitride powder are very important requirements. The aluminum nitride powder preferably has a purity of at least 95% by weight, especially at least 97% by weight. The aluminum nitride powder contains impurities which are originally contained in the raw material and carried over inevitably. These impurities differ depending upon the purity of the raw material for the production of the aluminum nitride powder.

These impurity compounds are, for example, compounds containing silicon, manganese, iron, chromium, nickel, cobalt, copper, zinc, titanium, etc. as a cationic component. Generally, the cationic component of these impurity compounds affects the properties, such as thermal conductivity, of the resulting composite sintered body. The amount of the metal compound as impurity is desirably not more than 0.3% by weight, preferably not more than 0.2% by weight, more preferably not more than 0.1% by weight, as metal.

In the production of the aluminum nitride powder used in this invention, the raw material may be calcined after adding a metal of Group IIa or IIIa of the periodic table to obtain aluminum powder containing the compound of a metal of Group IIa or IIIa. The aluminum nitride powder may be obtained by any method of production so long as it has the aforesaid properties. One method of producing the aluminum nitride powder of this invention conveniently used in this invention specifically comprises the steps of:

(1) intimately mixing fine particles of aluminum oxide having an average particle diameter of not more than 2 micrometers with fine particles of carbon having an ash content of 0.2% by weight and an average particle diameter of not more than 1 micrometer in a liquid dispersing medium, the weight ratio of the fine paricles of aluminum oxide to the fine particles of carbon being from 1:0.36 to 1:1;

(2) drying the resulting intimate mixture optionally, and calcining it at a temperature of 1400° to 1700° C. in an atmosphere of nitrogen or ammonia; and (3) heating the resulting fine powder at a temperature of 600° to 900° C. in an atmosphere containing oxygen to oxidize and remove the unreacted carbon.

The above method can give an aluminum nitride powder which, for example, has an aluminum nitride content of at least 95% by weight, a bound oxygen content of at most 3.0% by weight, and an average particle diameter of not more than 2 micrometers with at least 70% by volume of particles having a particle diameter of not more than 3 micrometers, and contains at most 0.3% by weight, as metal, of metal compounds as impurities.

According to the above method, it is possible to avoid the practice of a step of pulverizing aluminum nitride obtained by calcining the raw material. By omitting the pulverizing step, the contamination of impurity components in the pulverizing step can be avoided, and the surface of aluminum nitride can be prevented from undergoing oxidation and increase in oxygen content during the pulverization. Thus, the advantage of omitting the step of pulverizing aluminum nitride is unexpectedly very great. To omit the above pulverization step and to obtain aluminum nitride of good properties, it is preferable to employ a so-called wet mixing method by which alumina and carbon are mixed in a liquid dispersing medium. According to the wet mixing, the materials can be mixed intimately, and unexpectedly, it can prevent the starting particles from agglomerating to larger particles. The intimate mixture finally gives aluminum nitride consisting of fine and uniform particles by calcination. In addition, according to the wet-type mixing, impurities which may be included in the pulverizing step, etc. can be completely excluded, and the oxidation of the surface of aluminum nitride can be prevented. Hence, an aluminum nitride powder having better sinterability and a higher purity than in a conventional method can be obtained. This aluminum nitride powder can give a sintered body having a high thermal conductivity.

There is no particular limitation on the liquid dispersing medium used in the wet-mixing step, and all known solvents for wet-mixing can be used. Industrially, water, hydrocarbons, aliphatic alcohols are preferably used. Examples of preferred hydrocarbons are petroleum ether, hexane, benzene and toluene, and examples of preferred aliphatic alcohols are methanol, ethanol and isopropanol.

The production steps (1), (2) and (3) above are preferably carried out in devices made of a material which permits no inclusion of impurities remaining after calcination.

Known devices such as a mill including spherical or rod-like objects therein may be used to perform mixing in step (1). Preferably, the inner wall of the mill, and the spherical or rod-like objects are made of aluminum nitride itself or pure alumina having a purity of as high as 99.9% by weight or more in order to avoid inclusion of impurities remaining after calcination in aluminum nitride. That surface of the mixing device which makes contact with the raw materials may be made of, or coated with, a plastic. Such a plastic is not particularly limited, and may, for example, include polyethylene, polypropylene, nylon, polyesters, polyurethane, etc. Since the plastics may contain various metal components as stabilizers, they should be checked before use.

The mixing can be carried out at room temperature under atmospheric pressure, and is not adversely affected by temperature or pressure conditions.

The alumina powder used in step (1) should have an average particle diameter of not more than 2 micrometers and a purity of at least 99.0% by weight, preferably at least 99.9% by weight. The carbon powder should have an ash content of at most 0.2% by weight, preferably about 0.1% by weight at the highest, and an average particle diameter of not more than 1 micrometer. The carbon may, for example, be carbon black or graphitized carbon, the former being generally preferred.

The ratio of alumina to carbon varies depending upon their characteristics such as the purities and particle diameters of alumina and carbon. It is desirable therefore to determine it by performing preliminary tests. Usually, the weight ratio of alumina to carbon is from 1:0.36 to 1:1, preferably from 1:0.4 to 1:1.

The mixture obtained in step (1) is calcined at a temperature of 1400° to 1700° C. in an atmosphere of nitrogen in step (2) after optionally it is dried. If the calcination temperature is lower than the above-specified limit the reduction-nitriding reaction does not proceed industrially sufficiently. If it exceeds the upper limit specified above, the aluminum nitride obtained partly undergoes sintering and agglomeration among the particles, and it is difficult to obtain an aluminum nitride powder having the desired particle diameter.

The fine nitride particles obtained by calcination in step (2) is then heat-treated in step (3) at a temperature of 600° to 900° C. in an oxygen-containing atmosphere to oxidize and remove the unreacted carbon in the fine nitride particles.

The boron nitride powder used in this invention is neither restricted in particular, and any boron nitride powder can be used. A typical boron nitride powder generally preferred has a purity of at least 99.0% by weight and an average particle diameter of not more than 5 micrometers. The boron nitride powder can be produced by known methods exemplified below.

(1) A method which comprises heating $H_3BO_3$ or $Na_2B_4O_7$ at a temperature of 500° to 950° C. in the presence of urea in an atmosphere of $NH_3$.

(2) A method which comprises reacting $BCl_3$ with $NH_3$.

(3) A method which comprises heating Fe-B alloy at a temperature of 500° to 1400° C. dissolving it with, for example, an acid.

The metal compound of a metal of Group IIa or IIIa of the periodic table is not particularly restricted, either. Any known compounds of metals of Groups IIa or IIIa may be used. Preferred metals are, for example, calcium, strontium and barium from Group IIa, and yttrium and lanthanum-group metals from Group IIIa. Specific examples include yttrium, lanthanum, cerium, praseodymium, neodymium, promethium, samarium, europium, gadolinium, terbium, dysprosium, holmium, erbium, thullium, ytterbium and lutetium. Yttrium, lanthanum, cerium and neodymium are especially preferred. Suitable metal compounds include the nitrates, carbonates, chlorides, aluminates and oxides of these metals. Usually, heating of these metal compounds in an oxygen-containing gaseous atmosphere gives the corresponding oxides.

The method of this invention starts with the intimate mixing of powders of the aluminum nitride, boron nitride and metal compound described above. The intimate mixing can be accomplished by methods known per se, for example wet-mixing described above in regard to the production of aluminum nitride powder or dry-mixing in the absence of a liquid dispersing medium. Desirably, the mixing operation is used in a mixing device made of such a material as highly pure alumina or aluminum nitride, or its inner surface is coated with a plastic material, in order to avoid contamination during the mixing.

The mixing ratio of the starting materials is such that based on the total amount of aluminum nitride and boron nitride, the proportion of the aluminum nitride powder is 50 to 97% by weight, preferably 65 to 95% by weight, and the proportion of the boron nitride powder is 50 to 3% by weight, preferably 35 to 5% by weight.

The compound of the Group IIa or IIIa metal may be used in such an amount that its proportion as the metal oxide of the highest atomic valence is desirably 0.01 to 5% by weight, preferably 0.05 to 4% by weight, in the composite sintered body. Since the amount of the metal compound added varies depending upon the oxygen content of the composite sintered body, the content of impurities and the properties required of the composite sintered body, suitable amounts can be determined in advance according to these factors. As required, a binder, a peptizer, a plasticizer, etc. may be added in the above mixing step.

The starting mixture so obtained is then sintered at a temperature of 1600° to 2400° C. under atmospheric or elevated pressures after as required it is molded or dried. The sintering can be carried out in an inert atmosphere such as a nitrogen gas atmosphere. Specifically, the sintering can be carried out at 1600° to 2400° C. under atmospheric pressure, or by applying an uniaxial or isostatic pressure of 5 to 500 kg/cm². Sintering by uniaxial pressurization can be carried out preferably under a pressure of 50 to 300 kg/cm² at a temperature of 1600° to 2400° C. Sintering under the isostatic pressure can be preferably carried out under a pressure of 5 to 500 kg/cm² at a temperature of 1900° to 2400° C.

The average temperature elevating speed during the sintering can be determined properly within the range of 5° C./min. to 40° C./min. depending upon the type and amount of the sintering aid to be added.

The resulting composite nitride sintered body of this invention contains the metal compound of the Group IIa or IIIa metal in addition to aluminum nitride and boron nitride. It may sometimes contain the metal compound in an amount less than the amount of the starting metal compound to be mixed with the aluminum nitride and boron nitride powders before the sintering treatment or the amount of a substance that can be converted to the metal compound. This is believed to be because part of the metal compound or the compound convertible to the metal compound sublimes during sintering. It is important however that the metal compound should remain even in a trace amount even if most of it has been dissipated during the sintering. Normal sintering under atmospheric pressure of only the aluminum nitride and boron nitride powders cannot give a compact composite sintered body. Furthermore, even when the aluminum nitride and boron nitride powders are mixed and sintered in the presence of the metal compound, a compact composite sintered body cannot be obtained under such conditions that the sintering proceeds after substantially all of the metal compound added has sublimed. Presumably, therefore, the aforesaid specific metal compound used in the composite nitride sintered body of this invention not only acts to aid in sintering of the aluminum nitride and boron nitride powders, but also constitutes some factor which imparts the properties of machinable ceramics to the resulting composite nitride sintered body when integrated with the aluminum nitride and boron nitride powders.

The composite nitride sintered body of this invention is a sintered body having a high density and a high purity, and for example has a density at least 85%, preferably at least 90%, especially preferably at least 95%, of theory. The theoretical density of the sintered body of this invention is defined by a value calculated from the theoretical density of aluminum nitride which is 3.26 g/cm³ and the theoretical density of boron nitide which is 2.27 g/cm³ in accordance with the following equation.

$$d = \frac{d_A \cdot d_B}{Ad_B + Bd_A} \times 100$$

wherein d is the density (g/cm³) of the composite nitride sintered body, $d_A$ is the theoretical density (g/cm³) of aluminum nitride, $d_B$ is the theoretical density (g/cm³) of boron nitride, A is the content (weight %) of aluminum nitride, and B is the content (weight %) of boron nitride.

Specifically, the composite nitride sintered body of this invention has a density of, for example, at least 2.3 g/cm³, preferably at least 2.5 g/cm³, especially preferred at least 2.7 g/cm³.

The proportions of the individual components constituting the composite nitride sintered body of this invention can be selected from a wide range according to the properties required of the composite nitride sintered body. For example, based on the total amount of aluminum nitride and boron nitride, it contains 50 to 97% by weight of aluminum nitride and 50 to 3% by weight of boron nitride, and preferably, it contains 65 to 95% by weight of aluminum nitride and 35 to 5% by weight of boron nitride on the same basis. Furthermore, based on the total amount of aluminum nitride and boron nitride, it contains 0.01 to 5% by weight of the compound of a metal of Group IIa or IIIa of the periodic table, and preferably, it contains 0.01 to 3% by weight of the aforesaid metal compound on the same basis.

In the sintered body of this invention, the metal compound of the Group IIa metal is, for example, an oxide of calcium, strontium or barium, or an aluminate of the Group IIa metal. The metal compound of Group IIIa metal is, for example, an oxide of yttrium or a lanthanum-group metal, or an aluminate of the Group IIIa metal.

The composite nitride sintered body of this invention is characterized in that it can be a machinable ceramic even if the proportion of aluminum nitride constituting it is large. For example, a composite nitride sintered body containing 60 to 97% by weight, particularly 70 to 90% by weight, of aluminum nitride has the properties of a fully machinable ceramic. This is the most characteristic feature of the composite sintered body of this invention in view of the previous thought that a conventional composite sintered body composed of aluminum nitride and boron nitride is not machinable if its aluminum nitride content is high (see Japanese Patent Publication No. 30163/1977).

The composite nitride sintered body of this invention is also characteristic in that it is a fully machinable ceramic irrespective of the method of its production or of whether the sintering is carried out under elevated pressures or under atmospheric pressure.

This characteristic is surprising in view of the fact that no composite sintered body of aluminum nitride and boron nitride obtained by sintering under atmospheric pressure is known which is a machinable ceramic.

There is no established method of quantitatively expressing machinability. But if a certain sintered body can be turned by a carbide tip of K10 stipulated in JIS B-4104 (Rockwell hardness at least 90.5; bending strength at least 120 kgf/mm$^2$) to a cut depth of 0.1 to 2 mm at a cutting speed of 10 to 50 m/min., it may be said to have good machinability.

By another method of expression, it may be said to have good machinability if it can be drilled by a carbide solid drill having a diameter of 0.8 mm with a torque of 2 to 6 kgf.mm, a thrust of 5 to 10 kgf and a feed of 3 to 30 micrometers/rev.

The composite nitride sintered body of this invention is not only machinable, but also has high strength, high hardness, excellent heat resistance, a high thermal conductivity, a low coefficient of thermal expansion, a low dielectric constant, a low dielectric loss, high insulating, excellent corrosion resistance and excellent lubricity. The sintered body of this invention has a thermal conductivity of, for example, at least 20 W m$^{-1}$ K$^{-1}$, preferably at least 40 W m$^{-1}$ K$^{-1}$.

FIGS. 1 and 2 show microphotographs of the mechanically fractured sectional surfaces of the composite nitride sintered bodies of invention taken through a scanning electron microscope.

Crystal grains shown in a polygonal form in the mechanically fractured surfaces shown in FIGS. 1 and 2 are crystal grains of sintered aluminum nitride. In the mechanically fractured surfaces, the aluminum nitride sintered grains are formed by closely packed fine crystal grains which are dintinguished from each other by clear contours. The clear contours on the fractured surface of the fine crystal grains are polygonal. Let the average particle diameter of the fine crystals on the fractured surface defined by the above clear contour be D, the fine crystals comprise at least 70% of crystal grains having a particle diameter in the range of 0.3D to 1.8D. Previously, there has not been known an aluminum nitride sintered body or an aluminum nitride composite sintered body which gives a fractured surface where at least 70% of the grains have a particle diameter in the range of 0.3D to 1.8D, that is an aluminum nitride sintered body or an aluminum nitride composite sintered body having polygonal grains of a relatively uniform size on the fractured surface.

It is also clearly seen from FIGS. 1 and 2 that thin layer-like crystal grains exist in the interposed state in a part or the whole of the grain boundary packed with polygonal crystal grains of the aluminum nitride. These thin layer-like crystal grains are sintered crystal grains composed of boron nitride. It is believed that in the mechanically fractured surfaces of the sintered bodies clearly shown in FIGS. 1 and 2, the thin layer-like crystal grains composed of boron nitride present in the grain boundary of aluminum nitride constitute an important factor which impart the properties of machinable ceramics to the composite sintered body of this invention. Specifically, it is understood that the thin layer-like crystal grains composed of boron nitride present in the grain boundary of the aluminum nitride grains absorbs forces applied externally during machining and thus prevents destruction of the aluminum nitride sintered grains and enables high-speed cutting of the composite sintered body by ordinary tools.

The presence of the metal compound of the Group IIa or IIIa metal in the composite nitride sintered body cannot be determined from a micrograph of its mechanically fracured surface. Generally, the metal compound can be qualitatively or quantitatively analyzed by using an X-ray microanalyzer, an X-ray fluorescence spectrometric analyzer, etc.

As stated above, in the composite nitride sintered body of this invention, the aluminum nitride crystal grains and the boron nitride crystal grains are closely packed as discrete phases in its mechanically fractured surface, and more specifically, in the mechanically fractured surface, the aluminum nitride crystal grains are polygonal and the boron nitride crystal grains are interposed in thin layer form among the aluminum nitride crystal grains.

The following Examples illustrate the present invention more specifically. The machinability of the sintered bodies in these examples was determined as follows: A sample having a thickness of 3 mm was drilled by a carbide solid drill having a diameter of 0.2 mm with a torque of 4 kgf/mm, a thrust of 7 kgf and a feed of 16 micrometer/rev. The machinability was evaluated as "good" when the sample could be drilled, and "fair" when the drilling of the sample was not impossible but the blade tip underwent heavy wear.

EXAMPLE 1

One hundred parts by weight of alumina having a purity of 99.99% (the analytical impurity values are shown in Table 1) and an average particle diameter of 0.52 micrometer and containing 95% by volume of particles with a particle diameter of 3 micrometers or below was mixed uniformly with 50 parts by weight of carbon black having an ash content of 0.08% by weight and an average particle diameter of 0.45 micrometer in the presence of ethanol as a liquid dispersing medium in a ball mill consisting of a nylon pot and balls.

The mixture was dried, put in a flat plate made of highly pure graphite, and heated in an electric furnace at 1600° C. for 6 hours while continuously feeding highly pure nitrogen gas into the furnace at a rate of 3 liters/min.

The reaction product was heated in the air at 750° C. for 4 hours to oxidize and remove the unreacted carbon.

The resulting white powder was found to be a single phase of AlN by X-ray diffraction analysis, and did not show a diffraction peak of $Al_2O_3$. The average particle diameter of the powder, measured by a particle size distribution analyzer (CAPA-500 made by Horiba Seisakusho, Co., Ltd.), was 1.31 micrometers. It contained 90% by volume of AlN particles having a particle diameter of 3 micrometers or less. An observation under a scanning electron microscope showed that the powder consisted of uniform particles with an average particle diameter of about 0.7 micrometer. The specific surface area of the powder measured was 4.0 m²/g. The analytical values of the powder are shown in Table 2.

TABLE 1

| Analytical values of $Al_2O_3$ powder | |
|---|---|
| $Al_2O_3$ content | 99.99% |
| Element | Content (ppm) |
| Mg | <5 |
| Cr | <10 |
| Si | 30 |
| Zn | <5 |
| Fe | 22 |
| Cu | <5 |
| Ca | <20 |
| Ni | 15 |
| Ti | <5 |

TABLE 2

| Analytical values of AlN powder | |
|---|---|
| AlN content | 97.8% |
| Element | Content (ppm) |
| Mg | <5 |
| Cr | 21 |
| Si | 125 |
| Zn | 9 |
| Fe | 20 |
| Cu | <5 |
| Mn | 5 |
| Ni | 27 |
| Ti | <5 |
| Co | <5 |
| Al | 64.8 (wt. %) |
| N | 33.4 (wt. %) |
| O | 1.1 (wt. %) |
| C | 0.11 (wt. %) |

Eighty parts by weight of the resulting aluminum nitride powder, 20 parts by weight of a powder of hexagonal boron nitride having an average particle diameter of 2.5 micrometers and a purity of 99.5% and containing 95% by volume of particles having a particle diameter of 5 micrometers or less, and 8.4 parts of calcium nitrate tetrahydrate were uniformly mixed in a ball mill consisting of a nylon pot and balls coated with nylon in the presence of ethanol as a dispersing medium. The slurry obtained was dried in a dryer at 60° C. for 24 hours.

The mixed powder (12 g) was hot-pressed in a carbon mold coated with BN for 3 hours under a pressure of 200 kg/cm² at 2000° C. in nitrogen under 1 atmosphere at an average temperature elevating rate of 15° C./min. The sintered body was slightly yellowish white. An X-ray diffraction analysis of the sintered body showed it to be composed of two phases of aluminum nitride and hexagonal boron nitride. It had a density, measured by the Archemedes' method, of 2.96 g/cm².

A test piece having a length of about 40 mm with a square cross-section each side measuring about 3 mm was cut off from the sintered body. It was polished with #1500 sand paper, and then its bending strength was measured by a three-point bending method (crosshead speed 1 mm/min., span 20 mm). The average bending strength calculated from the measured values was 35 kg/mm².

A prismatic test piece having a length of 17 mm with a square cross-section each side measuring about 3 mm was prepared from the sintered body. By using a thermomechanical analyzer (CN8098 D2 made by Rigaku Denki Co., Ltd.), the coefficient of thermal expansion of the test piece at room temperature to 800° C. was measured under a load of 10 g at a temperature elevating rate of 5° C./min. The average coefficient of thermal expansion was $4.2 \times 10^{-6}$ for temperature elevation from room temperature to 400° C., $4.7 \times 10^{-6}$ for temperature elevation from room temperature to 400° C., and $5.0 \times 10^{-6}$ for temperature elevation from room temperature to 800° C.

A test piece having a diameter of 10 mm and a thickness of 2.5 mm was cut off from the sintered body, and its thermal constant at room temperature was measured by using a laser flush method thermal constant measuring device (PS-7 made by Rigaku Denki Co., Ltd.). Its thermal conductivity was found to be 85 W/m.K. The machinability of the composite sintered body obtained in this Example was examined. It could be easily drilled by a carbide drill and turned at high speed by a carbide tool. Consequently, the sintered body was found to have good machinability.

A microphotograph of a mechanically fractured surface of the composite sintered body obtained in this Example was taken through a scanning electron microscope and is shown in FIG. 1.

FIG. 1 shows that boron nitride crystal grains exist in thin layer form in the interposed state in a part or the whole of the grain boundary of polygonal aluminum nitride crystal grains, and they constitute a compact integral sintered body. It was determined by comparing the electron microphotograph with X-ray patterns of aluminum and boron by an X-ray microanalyzer.

EXAMPLES 2-5

Example 1 was repeated except that the mixing proportions of the aluminum nitride powder and the hexagonal boron nitride powder were changed as shown in Table 3. The results are shown in Table 3.

A microphotograph of a mechanically fractured surface of the sintered body obtained in Example 4 which was taken through a scanning electron microscope is shown in FIG. 2.

TABLE 3

| Example | 2 | 3 | 4 | 5 |
|---|---|---|---|---|
| AlN (weight parts) | 60 | 70 | 90 | 95 |
| Hexagonal BN (weight parts) | 40 | 30 | 10 | 5 |
| Calcium nitrate tetrahydrate (weight parts) | 8.4 | 8.4 | 8.4 | 8.4 |
| Density (g/cm$^3$) | 2.78 | 2.82 | 3.09 | 3.15 |
| Bending strength (kg/mm$^2$) | 12 | 20 | 40 | 45 |
| Average coefficient of thermal expansion* (1) | $4.0 \times 10^{-6}$ | $4.2 \times 10^{-6}$ | $3.8 \times 10^{-6}$ | $3.7 \times 10^{-6}$ |
| (2) | $4.3 \times 10^{-6}$ | $4.6 \times 10^{-6}$ | $4.4 \times 10^{-6}$ | $4.0 \times 10^{-6}$ |
| (3) | $4.8 \times 10^{-6}$ | $4.8 \times 10^{-6}$ | $4.6 \times 10^{-6}$ | $4.5 \times 10^{-6}$ |
| Thermal conductivity (W/m.K) | 55 | 83 | 91 | 122 |
| Machinability | Good | Good | Good | Fair |

*(1) room temperature - 400° C.
(2) room temperature - 600° C.
(3) room temperature - 800° C.

EXAMPLES 6-8

Example 1 was repeated except that the metal compounds indicated in Table 4 were used in the amounts indicated in Table 4. The results are shown in Table 4.

TABLE 4

| Example | 6 | 7 | 8 |
|---|---|---|---|
| AlN (weight parts) | 80 | 80 | 80 |
| Hexagonal BN (weight parts) | 20 | 20 | 20 |
| Group IIa metal compound (weight parts) | Ca(NO$_3$)$_2$.4H$_2$O 4.2 | Ca(NO$_3$)$_2$.4H$_2$O 17 | Ba(NO$_3$)$_2$ 6.8 |
| Density (g/cm$^3$) | 2.92 | 2.96 | 2.96 |
| Bending strength (kg/mm$^2$) | 34 | 35 | 37 |
| Average coefficient of thermal expansion* (1) | $4.0 \times 10^{-6}$ | $4.2 \times 10^{-6}$ | $4.0 \times 10^{-6}$ |
| (2) | $4.5 \times 10^{-6}$ | $4.8 \times 10^{-6}$ | $4.6 \times 10^{-6}$ |
| (3) | $4.8 \times 10^{-6}$ | $4.9 \times 10^{-6}$ | $5.0 \times 10^{-6}$ |
| Thermal conductivity (W/m.K) | 68 | 80 | 85 |
| Machinability | Good | Good | Good |

*(1) room temperature - 400° C.
(2) room temperature - 600° C.
(3) room temperature - 800° C.

EXAMPLES 9-11

Example 1 was repeated except that each of the Group IIIa metal compounds shown in Table 5 was used instead of calcium nitrate tetrahydrate, and the mixing proportions of these were adjusted respectively to 4 parts by weight as oxide. The results are shown in Table 5.

TABLE 5

| Example | 9 | 10 | 11 |
|---|---|---|---|
| AlN (weight parts) | 80 | 80 | 80 |
| Hexagonal BN (weight parts) | 20 | 20 | 20 |
| Group IIIa metal compound (weight parts) | Y(NO$_3$)$_3$.6H$_2$O 14 | La(NO$_3$)$_3$.6H$_2$O 11 | Ce(NO$_3$)$_3$.6H$_2$O 11 |
| Density (g/cm$^3$) | 2.96 | 2.96 | 2.96 |
| Bending strength (kg/mm$^2$) | 36 | 35 | 36 |
| Average coefficient of thermal expansion* (1) | $4.2 \times 10^{-6}$ | $4.3 \times 10^{-6}$ | $4.2 \times 10^{-6}$ |
| (2) | $4.6 \times 10^{-6}$ | $4.7 \times 10^{-6}$ | $4.7 \times 10^{-6}$ |
| (3) | $4.9 \times 10^{-6}$ | $4.9 \times 10^{-6}$ | $5.0 \times 10^{-6}$ |
| Thermal conductivity (W/m.K) | 84 | 82 | 78 |
| Machinability | Good | Good | Good |

*(1) room temperature - 400° C.
(2) room temperature - 600° C.
(3) room temperature - 800° C.

EXAMPLE 12

A mixed powder (12 g) having the same composition as that of the mixed powder obtained in Example 7 was put in a mold having an inside diameter of 55 mm, uniaxially pressed under a pressure of 200 kg/cm$^2$, and then hydrostatically pressed under a pressure of 2000 kg/cm$^2$ to obtain a disc-like molded article.

The molded article was put in a receptacle made of boron nitride, and calcined in a nitrogen atmosphere under 1 atmosphere for 3 hours at 1900° C. The resulting sintered body was white and had a density of 2.9 g/cm$^3$.

The properties of the sintered body were measured in the same way as in Example 1. The sintered body had a bending strength of 31 kg/mm$^2$, and an average coefficient of linear thermal expansion of $4.0 \times 10^{-6}$ for room temperature—400° C., $4.6 \times 10^{31}$ $^6$ for room temperature—600° C., and $4.8 \times 10^{-6}$ for room temperature to 800° C.

The machinability of the sintered body was examined in the same way as in Example 1 and found to be as good as that of the sintered body obtained in Example 1.

EXAMPLE 13

Example 1 was repeated except that a powder obtained by nitriding metallic aluminum and then pulverizing the aluminum nitride was used instead of the aluminum powder used in Example 1. The aluminum nitride powder used had an average particle diameter of 2.5 micrometers, an oxygen content of 2.5% by weight and a cationic impurity content of 0.35% by weight and contained 50% by volume of particles having a particle diameter of 3 micrometers or less.

The resulting sintered body was gray, and white spots were observed here and there. It had a density of 2.95 g/cm$^3$.

The properties of the sintered body were measured in the same way as in Example 1. It had a bending strength of 25 kg/mm$^2$, a thermal conductivity of 35 W/mK, and an average coefficient of linear thermal expansion of $4.2\times10^{-6}$ for room temperature—400° C., $4.7\times10^{-6}$ for room temperature—600° C., and $5.0\times10^{-6}$ for room temperature—800° C.

The machinability of the sintered body was examined in the same way as in Example 1, and found to be as good as that of the sintered body obtained in Example 1 although having slightly inferior precision machinability.

EXAMPLE 14

Eighty (80) parts by weight of the aluminum nitride powder obtained in Example 1, 20 parts by weight of the same hexagonal boron nitride powder as used in Example 1, and 2.1 parts by weight of calcium aluminate ($3Ca.Al_2O_3$) were mixed in the dry state by using a nylon pot and nylon-coated balls.

The mixture was sintered in the same way as in Example 1 except that the average temperature elevating rate was changed to 8° C./min. The resulting sintered body had a density of 2.97 g/cm$^3$, a bending strength of 39 kg/mm$^2$, an average coefficient of thermal expansion (room temperature—600° C.) of $4.6\times10^{-6}$, and a thermal conductivity of 88 W/mK. Its machinability was good.

EXAMPLE 15

Example 12 was repeated except that the calcination was carried out in nitrogen gas under 9.8 kg/cm$^2$. The resulting sintered body had a density of 2.94 g/cm$^3$, a bending strength of 36 kg/mm$^2$, an average coefficient of thermal expansion (room temperature—600° C.) of $4.7\times10^{-6}$ and a thermal conductivity of 90 W/mK. Its machinability was good.

EXAMPLES 16–18

Example 1 was repeated except that each of the metal compounds indicated in Table 6 was used instead of the calcium nitrate tetrahydrate. The results are shown in Table 6. The average temperature elevating rate in Example 17 was 10° C./ min.

TABLE 6

| Example | 16 | 17 | 18 |
|---|---|---|---|
| AlN (weight parts) | 80 | 80 | 80 |
| Hexagonal BN (weight parts) | 20 | 20 | 20 |
| Metal compound | CaO | Y2O3 | YAlO3 |
| (weight parts) | 1 | 1 | 1.5 |
| Density (g/cm$^3$) | 2.97 | 2.96 | 2.96 |
| Bending strength (kg/mm$^2$) | 38 | 34 | 36 |
| Average coefficient of thermal expansion* (1) | $4.2\times10^{-6}$ | $4.2\times10^{-6}$ | $4.3\times10^{-6}$ |
| (2) | $4.6\times10^{-6}$ | $4.7\times10^{-6}$ | $4.7\times10^{-6}$ |
| (3) | $4.9\times10^{-6}$ | $4.9\times10^{-6}$ | $5.0\times10^{-6}$ |
| Thermal conductivity (W/m.K) | 86 | 82 | 80 |
| Machinability | Good | Good | Good |

*(1) room temperature - 400° C.
(2) room temperature - 600° C.
(3) room temperature - 800° C.

What is claimed is:

1. A composite nitride sintered body having good machinability and consisting essentially of aluminum nitride, hexagonal boron nitride and at least one metal compound selected from the group consisting of compounds of metals of calcium, strontium, barium, yttrium and lanthanides, said composite nitride sintered body having a density at least 90% of its theoretical density, the amount of aluminum nitride being 60 to 95% by weight, and the amount of boron nitride being 40 to 5% by weight, both based on the total weight of aluminum nitride and boron nitride, and the amount of at least one of said metal compounds as the oxide of the metal of the highest atomic valence being 0.01 to 5% by weight based on the weight of the composite nitride sintered body.

2. The composite nitride sintered body of claim 1 wherein the amount of aluminum nitride is 65 to 95% by weight, and the amount of boron nitride is 35 to 5% by weight, both based on the total weight of aluminum nitride and boron nitride.

3. The composite nitride sintered body of claim 1 wherein the amount of at least one of said metal compounds as the oxide of the metal of the highest atomic valence is 0.01 to 3% by weight based on the total weight of aluminum nitride and boron nitride.

4. The composite nitride sintered body of claim 1 wherein the metal compound is an oxide of calcium, strontium or barium.

5. The composite nitride sintered body of claim 1 wherein the metal compound of calcium, strontium or barium is an aluminate of said metal.

6. The composite nitride sintered body of claim 1 wherein the metal compound of yttrium or lanthanides is an aluminate of said metal.

7. The composite nitride sintered body of claim 2 wherein the metal compound is an oxide of yttrium of a lanthanum-group metal.

8. The composite nitride sintered body of claim 1 which has a thermal conductivity of at least 20 w/mK.

9. The composite nitride sintered body of claim 1 which has a thermal conductivity of at least 40 w/mK.

10. The composite nitride sintered body of claim 1 wherein crystal grains of aluminum nitride and crystal grains of boron nitride are closely packed as discrete phases in its mechanically fractured surface.

11. The composite nitride sintered body of claim 1 wherein in its mechanically fractured surface, crystal grains of aluminum nitride are polygonal, and thin layer-like crystal grains of boron nitride are interposed among the aluminum nitride crystal grains.

* * * * *